MAGNETORESISTIVE STORAGE DEVICE

Filed Dec. 18, 1961

INVENTORS
FIROOZ PARTOVI
CHARLES PETTUS
THOMAS YOUNG

BY Leo J. Aubel
ATTORNEY

United States Patent Office 3,160,863

Patented Dec. 8, 1964

3,160,863

MAGNETORESISTIVE STORAGE DEVICE

Firooz Partovi, Allston, Mass., and Charles Pettus, Vestal, and Thomas Young, Endicott, N.Y., assignors to International Business Machines Corporation, New York, N.Y., a corporation of New York Filed Dec. 18, 1961, Ser. No. 160,179
6 Claims. (Cl. 340—174)

This invention relates to a storage device and more particularly to a magnetoresistive storage device.

It is known that a number of conductors of electricity, mainly the ferro-magnetic metals such as iron, nickel, cobalt, and the alloys thereof change their electric resistivity when subjected to a magnetic field. The foregoing effect is distinct from the Hall effect in which, if a current is flowing in a first axis and if a flux field is at right angles to the first axis, an output voltage is generated across a third axis at right angles to the current excitation and flux axes.

It is a principal object of the present invention to provide a storage device capable of providing a non-destructive read out.

It is another object of the present invention to provide a storage device having a fast switching time in the millimicrosecond region.

It is another object of the present invention to provide a storage device operating on a voltage mode.

In the attainment of the foregoing objects, there is provided a storage device comprising, in combination, a ferro-magnetic element, current providing means connected across said element, and means for selectively inducing magnetic fields in relatively or transverse directions across said element, whereby differing voltage amplitudes are obtainable dependent upon the direction of the applied magnetic field.

The foregoing and other objects, features and advantages of the invention will be apparent from the following more particular description of preferred embodiments of the invention, as illustrated in the accompanying drawings.

Figure 1:
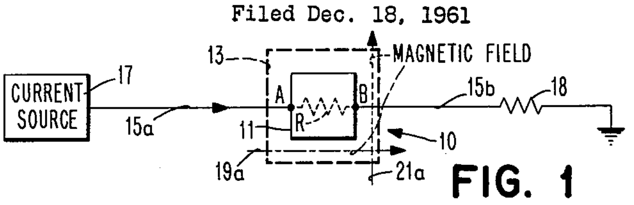
FIG. 1 shows a magnetic storage device in accordance with the invention.

Referring to FIG. 1, the storage device or element 10 in accordance with the invention may comprise a thin film 11, evaporated by any suitable techniques onto a substrate 13, such as glass. Lead lines 15*a* and 15*b* are connected to points A and B on opposite ends of the thin film 11. In one case, film 11 consists of a ½" x ½" evaporated ferro-magnetic film approximately 500 A. thick. The electrical contacts to the film 11 are made by soldering woods metal contacts along two opposite sides of the film.

A suitable generator or source of current 17 is connected to provide either a direct current or a pulsed current through leads 15*a* and 15*b* to the thin film 11. The thin film 11, in effect, comprises a resistor which is connected in series with leads 15*a* and 15*b* and resistor 18 to ground reference.

Figure 3:
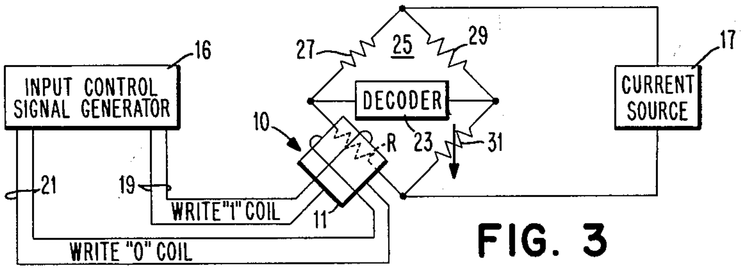
FIG. 3 shows a storage device in accordance with the invention connected to be responsive to input lines containing writing and erasing information.

Magnetic fields having lines of force indicated by dot-dash line 19*a* and dotted line 21*a* are provided to thin film 11, by suitable coils 19 and 21 respectively as shown, for example, in FIG. 3. Coils 19 and 21 have one or more turns around the respective film. The magnetic field indicated by dot-dash line 19*a* is in a direction parallel to the current flowing through film 11 and leads 15*a* and 15*b*. The magnetic field indicated by dotted line 21*a* is applied in a direction transverse or orthogonal to the direction of current flow through thin film 11. Note that to provide a magnetic field parallel to current flowing through film 11, the coil is wound orthogonal to the lead lines 15*a* and 15*b* (the known principal relating current flow to the induced magnetic field). Likewise, to provide a magnetic field 21*a* orthogonal to current flowing through film 11, the coil 21 is wound parallel to the lead lines 15*a* and 15*b*. Either one, or the other, or no field is selectively induced to film 11 as will be discussed hereinbelow.

The operation of the storage device 10 will now be described. Initially, current from generator or source 17 is provided through lines 15*a* and 15*b* to film 11 and the film effects a resistance R to the current flowing therethrough. When a magnetic field is provided in one direction, say, as indicated by a dot-dash line 19*a*, the voltage developed across the film 11 (across points A and B) may be given by the following equation:

$$E_{AB}=i(R+r_k)$$

where $i$ is the current flowing through the film,

R is the quiescent resistance of the film, $r_k$ is the dynamic resistance of the film when the applied magnetic field is parallel to the current flowing through the film.

When a magnetic field is provided in the orthogonal direction, indicated by dot-dash line 21*a*, the voltage developed across film 11, i.e., points A and B is given by the equation:

$$E'_{AB}=i(R+r'_k)$$

where $r'_k$ is the dynamic resistance when the applied magnetic field is orthogonal to the current flowing through film 11;

The other factors are as in the preceding equation.

It was found that the resistances $r_k$ and $r'_k$ are of the same magnitude although $r_k \neq r'_k$, and $R \gg r_k$ or $r'_k$;

also, $$r_k=\gamma H$$

and $$r'_k=\beta H$$

where $\gamma$ and $\beta$ are magnetoresistive coefficients which differ in polarity; and, H is the magnetic field indicated in suitable units.

Figure 2:
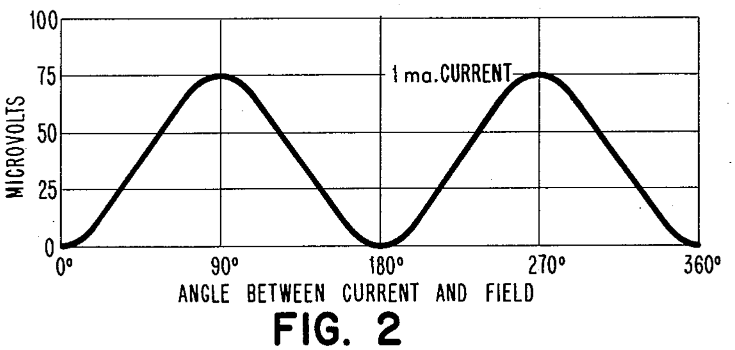
FIG. 2 shows some wave forms useful in explaining the operation of the device of FIG. 1.

Thus, if a magnetic field is induced in, say, a direction parallel to current flowing through film 11, a resistance of a first magnitude is evident across film 11; further, when the magnetic field in the said parallel direction is collapsed, the resistance across film 11 remains at said first magnitude. Similarly, when a magnetic field is developed in a direction relative orthogonal to current flowing through film 11, a resistance of a second magnitude is evident across film 11; and, when the magnetic field in said orthogonal direction is collapsed, the resistance across film 11 remains at said second magnitude. Also, the voltage developed across film 11 is independent of the sense of the applied field, i.e., whether the fields as indicated in for example, FIG. 1, are in the direction indicated by the arrowheads or whether the fields are directly opposite thereto will not effect a change in the voltage across film 11; this fact is evident from the voltage diagrams obtained in FIG. 2.

Because of the fact that $R \gg r_k$ or $r'_k$, a conventional bridge type of output circuit 25 is employed with device 10, see FIG. 3. Bridge 25 comprises resistors 27 and 29 in the first and second legs, a variable resistor 31 on the third leg, and the storage device 10, or more specifically, film 11 in the fourth leg. The source of current is connected across opposite corners of the bridge circuit 25 and provides a current flow through the resistor 27 and thin film 11 in parallel with a second flow through resistor 29 and variable resistor 31. Resistor 31 is adjusted to balance the bridge 25 as against the quiescent resistance R of the thin film 11. When the magnetic fields are selectively applied, the voltage appearing across the film 11 provides an unbalance which is sensed in the decoder 23. The voltage appearing across the decoder 23 is either of a first magnitude V1 or a second magnitude V2;

$$V1 \approx E_{AB} = i(R + r_k)$$

$$V2 \approx E_{AB} = i(R + r'_k)$$

Device 10 is thus capable of being used as a bistable storage device, and in effect storing a "1" or a "0" dependent on the voltage appearing thereacross. Because it can store "1" and "0," it may be used as a data transfer mechanism to provide the writing of a "1" or a "0" and by subsequently erasing the foregoing data.

More specifically, and referring to FIG. 3, write "1" coil 19 is energized by a suitable generator 16 to develop a magnetic field which is parallel to the direction of the current flowing through the thin film 11. This provides an unbalance of the bridge which causes a decoder to sense a variance of the quiescent voltage level and thus, in effect, writes a "1." In order to write "0" or erase the information provided by coil 19, the write "0" coil 21 is energized to provide a magnetic field perpendicular to the flow of current and thereby cause a second voltage level, i.e., a "0" to be registered in decoder 23, in accordance with the above equations. Note that if the write coil 10 is energized to write data, i.e., register a "1" in a decoder 23, the storage device 10 retains this particular resistance even after coil 19 is deenergized.

Figure 4:
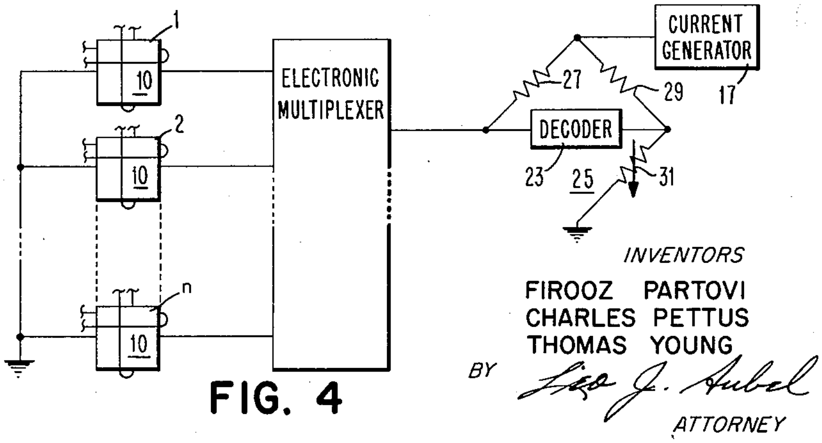
FIG. 4 shows a plurality of storage devices in accordance with the invention connecting through an electronic multiplexer to a decoder unit.

To utilize the foregoing storage element in a computer, the unit may be connected as shown in, for example, FIG. 4, in which a plurality of these units are selectively connected as one leg of the bridge circuit of FIG. 3. An electronic multiplexer of any suitable known type is arranged to selectively connect the various storage devices indicated collectively as 10 and individually as 1, 2, . . . N, in the fourth leg of the bridge circuit 25. The decoder will provide an indication of the particular voltage level, i.e., indicate either a "1" or "0" for a device 19 during successive time periods.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A bistable storage device comprising a ferro-magnetic element possessing magnetoresistive properties, means for providing current flow through said element in a given direction, means for selectively applying a magnetic field to said element in a first direction, and means for selectively applying a magnetic field to said element in a second direction transverse to said first direction whereby a voltage of a first and a second magnitude are obtained across said element determined by the last applied magnetic field.

2. A bistable storage device comprising a ferro-magnetic element possessing magnetoresistive properties, means for providing current flow through said element in a given direction, means for selectively applying a magnetic field to said element in a direction substantially parallel to the direction of said current flow, and means for selectively applying a magnetic field to said element in a direction transverse to said current flow whereby a voltage of a first and a second magnitude are obtained across said element determined by the last applied magnetic field.

3. A bistable storage device comprising a ferro-magnetic thin film possessing magnetoresistive properties, means for providing current flow through said film in a given direction, first and second current carrying coils arranged transversely to one another for providing relatively orthogonal magnetic fields to said thin film, and means for selectively energizing said coils whereby the resistance across said thin film and consequently the potential developed thereacross is determined by the last applied magnetic field.

4. A ferro-magnetic thin film possessing magnetoresistive properties, means for connecting said thin film in one leg of a bridge circuit, means for providing current flow through said thin film in a given direction, a quiescent resistance being measurable across said film, first and second current carrying coils arranged transversely to one another to provide first and second magnetic fields respectively for said thin film, said magnetic fields being relatively transverse to one another, means for selectively energizing said coils for changing the resistance of said thin film and thereby the voltage developed thereacross dependent upon which of the magnetic fields is applied thereto, and means for sensing the change of voltage across said thin film.

5. A ferro-magnetic thin film possessing magnetoresistive properties, means for providing current flow through said film in a given direction, said film effecting a resistance to current flow therethrough, means for providing a first magnetic field parallel to the direction of current flow therethrough said thin film, means for providing a second magnetic field in a transverse direction to the current flow flowing through said thin film, the resistance of said thin film being changed a first amount by the application of said first field and being changed a second amount by the application of said second field, and means for sensing said changes in resistance.

6. A ferro-magnetic thin film possessing magnetoresistive properties, means for providing current flow through said thin film in a given direction, a quiescent resistance being measurable across said film, first and second current carrying coils arranged transversely to one another to provide first and second magnetic fields respectively for said thin film, said magnetic fields being relatively transverse to one another, means for selectively energizing said coils for changing the resistance of said thin film and thereby the voltage developed thereacross dependent upon which of the magnetic fields is applied thereto, and means for sensing the change of voltage across said thin film.

References Cited in the file of this patent

UNITED STATES PATENTS

| | | |
|---|---|---|
| 2,500,953 | Libman | Mar. 21, 1950 |
| 2,876,419 | Gianola | Mar. 3, 1959 |
| 3,003,138 | Piechia | Oct. 3, 1961 |
| 3,004,243 | Rossing | Oct. 10, 1961 |